Jan. 22, 1935. R. N. SMITH Re. 19,440

DOORLOCK

Original Filed Nov. 4, 1929

INVENTOR
Robert N. Smith
BY Thos. E. Scofield
ATTORNEY

Reissued Jan. 22, 1935

Re. 19,440

UNITED STATES PATENT OFFICE 19,440

DOORLOCK

Robert N. Smith, Independence, Mo., assignor, by direct and mesne assignments, to Estel Scott and James L. Hogin, Kansas City, Mo.

Original No. 1,813,092, dated July 7, 1931, Serial No. 404,635, November 4, 1929. Application for reissue July 7, 1933, Serial No. 679,362

3 Claims. (Cl. 292—138)

My invention relates to improvements in door locks. It relates particularly to locks of automobile doors.

One of the objects of my invention is to provide a door lock with novel means for forcing the door of an automobile toward the open position when the door handle is operated to retract the bolt thus making a close fitting door easier to open.

A further object of my invention is to provide novel means of the kind described, which is simple, cheap, strong, durable, not likely to get out of order, and which is readily adapted for application to door locks of the kind commonly used.

The novel features of my invention are hereinafter fully described and claimed.

In the accompanying drawing, which illustrates the preferred embodiment of my invention, Fig. 1 is an elevation of my improved mechanism, looking toward the inside of the car, showing the mechanism applied to a car door lock of usual type, a part of the door and a portion of the adjacent jamb being shown in vertical section.

Similar reference characters designate similar parts in the different views.

Figure 1:
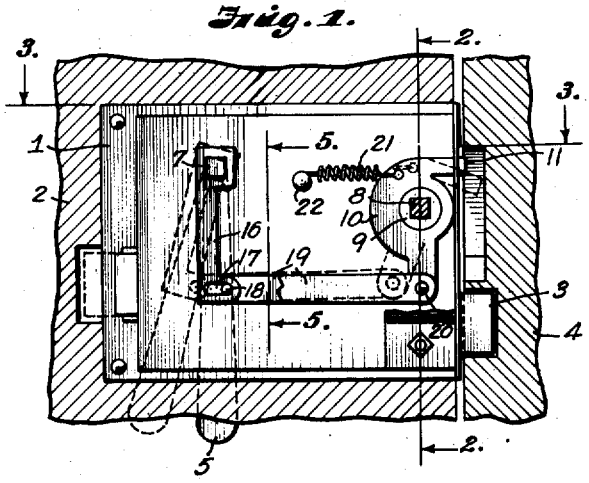

1 designates a lock casing of ordinary type shown mounted on a car door 2 and having the usual bolt 3 adapted for engagement in the usual manner with a door jamb 4.

5 and 6 designate respectively the inside handle and the outside handle of the lock, said handles being respectively provided with shafts 7 and 8 oscillatively mounted in the casing 1. The handles 5 and 6 are each connected by mechanism not shown, and which forms no part of my invention, with the bolt 3, whereby said handles may be independently operated from the inside and outside respectively of the car to retract the bolt 3 from engagement with the jamb 4.

Figure 4:
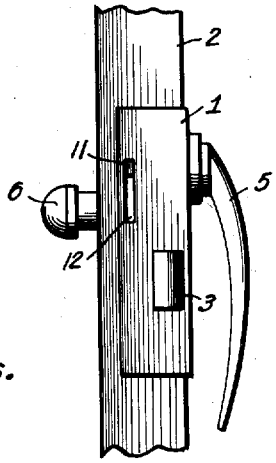
Fig. 4 is an end elevation of a lock provided with my improvement and shown mounted on a door, a portion only of which is shown.
Figure 5:
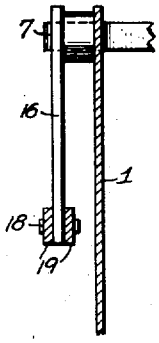
Fig. 5 is an enlarged section on the line 5—5 of Fig. 1.
Figure 7:
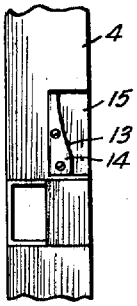
Fig. 7 is an edge elevation of a portion of a jamb provided with a strike plate, which forms a part of my improved mechanism.

On the square shaft 8 is fitted at the outer side of the casing a circular collar 9 on which is oscillatively mounted a push member 10 having a finger 11, which is movable through a slot 12 in the outside edge of the casing 1, Fig. 4, into travelling engagement with an outwardly and downwardly inclined surface 13 of a strike plate 14 fastened to the jamb 4 in an edge recess 15 which extends to the outer side of the jamb.

When the push member 10 is swung, clockwise as viewed in Fig. 1, the finger 11 will travel downwardly on the inclined surface 13 of the strike plate 14, thereby forcing the door 2 toward the open position, when the bolt 3 is retracted to clear the jamb 4.

For so swinging the push member 10 when the bolt 3 is retracted by the inside handle 5, the square shaft 7 of the latter has mounted on it and oscillative therewith at the outer side of the casing 1, a crank 16, which extends downwardly and adjacent to its lower end is provided with a transverse slot 17 through which extends a horizontal pin 18, which is slidable in the slot 17, and which is mounted in the adjacent ends of two horizontal links 19, the other ends of which are pivoted by a pin 20 to the push member 10 below the shaft 8, Fig. 1.

When the handle 5 is swung from the position shown in solid lines in Fig. 1, to the position shown in dotted lines in said figure, the crank 16, through the intermediacy of the pins 18 and 20 and the links 19, will swing the push member 10 clockwise, as viewed in Fig. 1, thus forcing the finger 11 into downwardly travelling engagement with the inclined surface 13 of the strike plate 14, and forcing the door 2 toward the open position as the bolt 3 is retracted from the jamb by the actuation of the handle 5, as described.

A coil spring 21, which is fastened at one end to the push member 10, above the shaft 8, and fastened at its other end to a pin 22 mounted in the casing 1, between the shafts 7 and 8, normally exerts a tension tending to retract the push member 10. As the links 19 are pivotally connected to the crank 16 and to the push member 10, the links will retract the push member to the release position in case the spring 21 should break and become inoperative.

The lost motion provided by the sliding of the pin 18 in the slot 17, is to enable the handle 5 to be swung to the right, from the position shown in solid lines in Fig. 1, for the purpose of locking the door by such movement of the handle, in locks of certain types, without actuating the push member 10.

Figure 6:
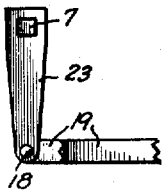
Fig. 6 shows in elevation a modified form of crank for actuating the opening mechanism when the latter is applied to another common type of lock.

In other types of locks in which the inside handle is not employed to lock the door, the shaft 7 has mounted on it the crank 23, shown in Fig. 6, in which case, the pin 18 is merely pivotally, and not slidably mounted in the crank 23, so that there is no lost motion between the crank 23 and the links 19.

In the operation of the device, the operator in the car swings the handle 5 from the position shown in solid lines in Fig. 1 to the dotted position shown in said figure, thus retracting the bolt 3 and swinging the push member, by means of the crank 16 or 23, as the case may be, the pins 18 and 20 and the links 19, so that the push member finger 11 travels downwardly on the strike plate surface 13 and forces the door open.

As the door usually opens easily from the outside, the push member 10 is pivotally mounted on the shaft 8 by means of the collar 9 on which the push member freely pivots, so that the operation of the outside handle 6 does not actuate the push member 10.

Figure 2:
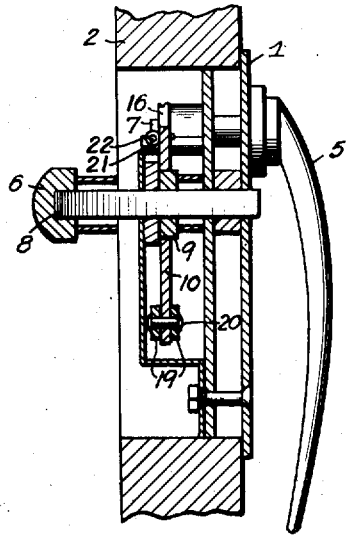
Fig. 2 is an enlarged section on the line 2—2, of Fig. 1.
Figure 3:
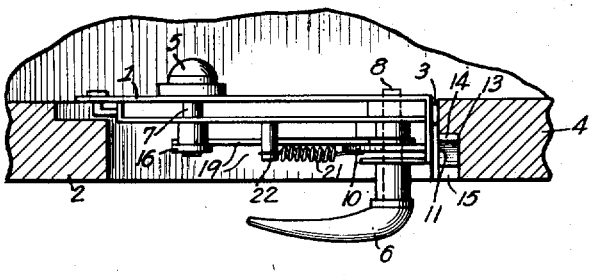
Fig. 3 is a section on the line 3—3 of Fig. 1.

The spring 21 is employed, in the form shown in Figs. 1, 2 and 3, merely to keep the push member 10 from any swinging movement when the handle 5 is in the position shown in solid lines in Fig. 1, which might occur due to the lost motion connection of the crank 16 with the links 19. In the form shown in Fig. 6, the spring 21 may be dispensed with, if desired.

I do not limit my invention to the structures shown and described, as other modifications, than the one shown, may be made, within the scope of the appended claims, without departing from the spirit of my invention.

What I claim is:

1. In a door lock, the combination with a lock casing, a bolt and two handles oscillative independently of each other on said casing for retracting said bolt, of a push member oscillative on one of said handles to and from a position in which it is adapted to have pushing engagement with a door jamb, and means actuated by the other of said handles for forcing said push member to said position, when the last named handle retracts said bolt.

2. In a door lock, the combination with a lock casing, a bolt and two handles oscillative on said casing for retracting said bolt, of a push member oscillative on one of said handles to and from a position in which it is adapted to have pushing engagement with a door jamb, a crank fastened to the other of said handles, and a link connecting said crank and said push member for forcing the latter to said position, when the handle to which the crank is fastened is operated to retract said bolt.

3. In a door lock, the combination with a lock casing, a bolt and two handles movable independently of each other on said casing for retracting said bolt, of a push member movable on one of said handles to and from a position in which it is adapted to have pushing engagement with a door jamb, and means actuated by the other of said handles for forcing said push member to said position, when the last named handle retracts said bolt.

ROBERT N. SMITH.